May 2, 1961
W. R. BECKNER, JR
2,981,962
WORK HANDLING MEANS COMPRISING MOVABLE CHUTE
SECTIONS TO ALLOW INDEXING OF WORK
CHUCK IN A TAPPING MACHINE
Filed Sept. 8, 1958
9 Sheets-Sheet 6
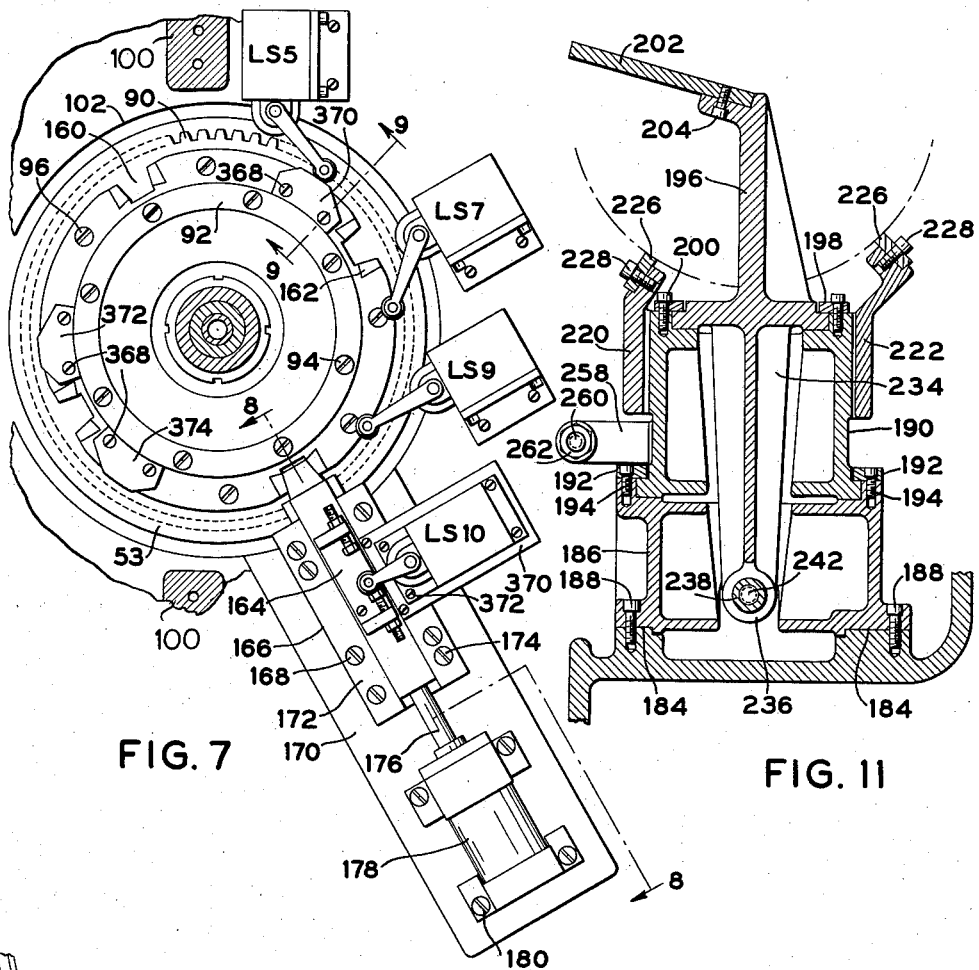
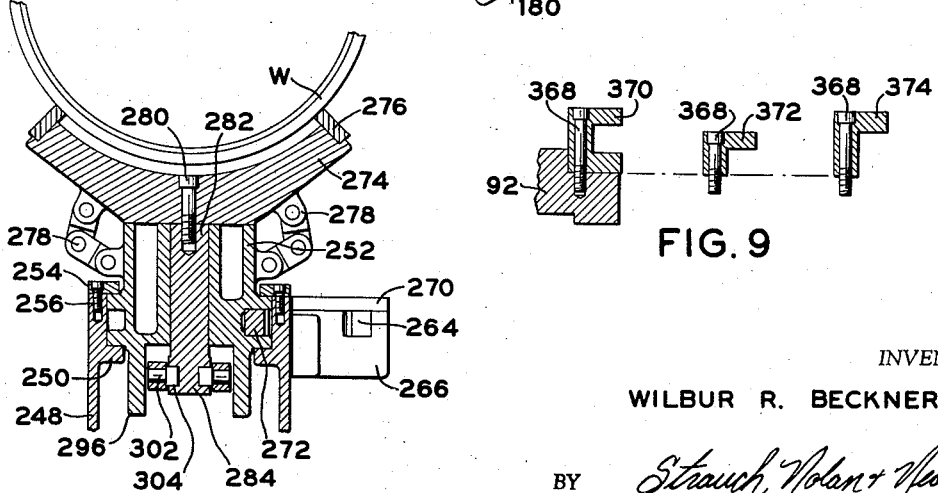
INVENTOR
WILBUR R. BECKNER, JR.
BY  *Strauch, Nolan + Neale*
ATTORNEYS

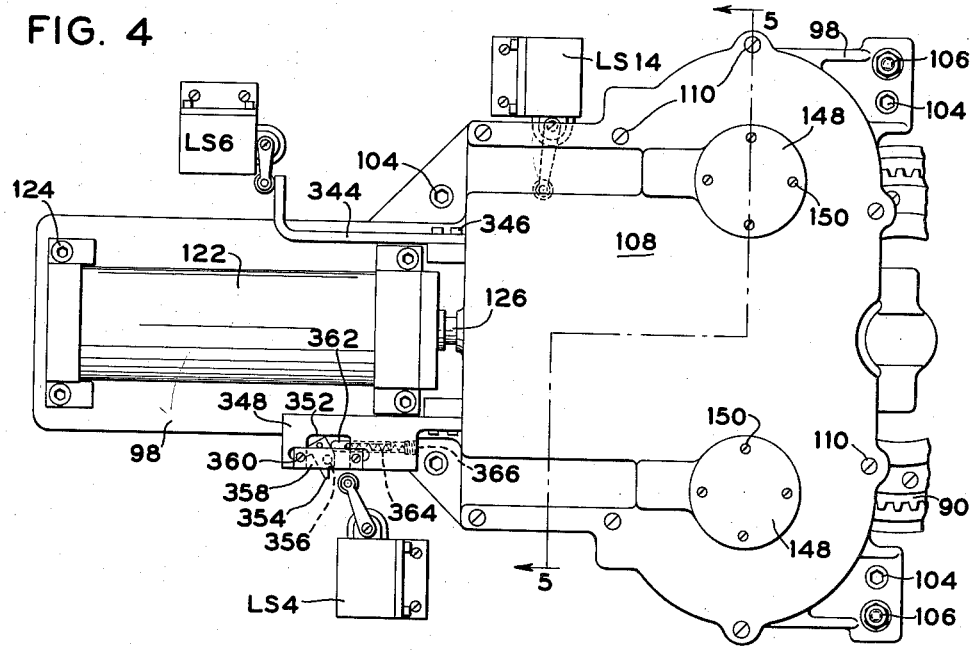
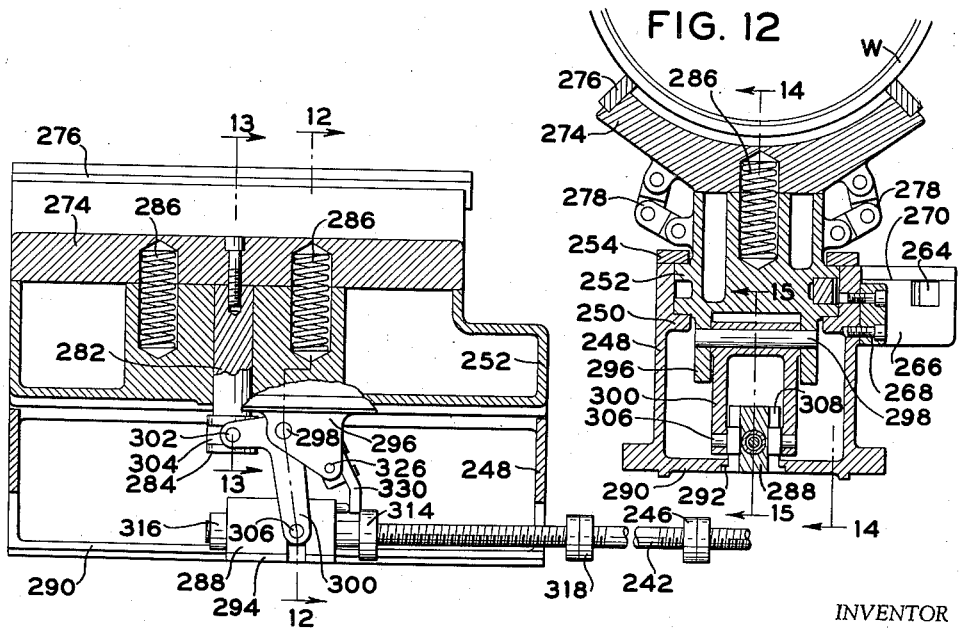
FIG. 4
FIG. 12
FIG. 14
INVENTOR
WILBUR R. BECKNER, JR.

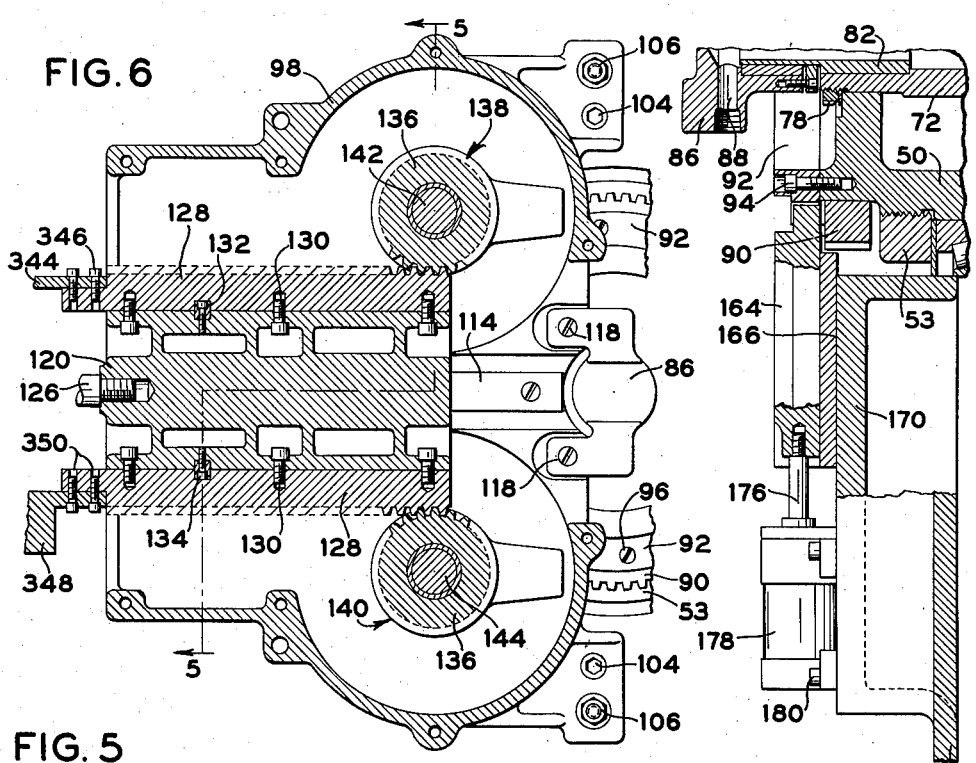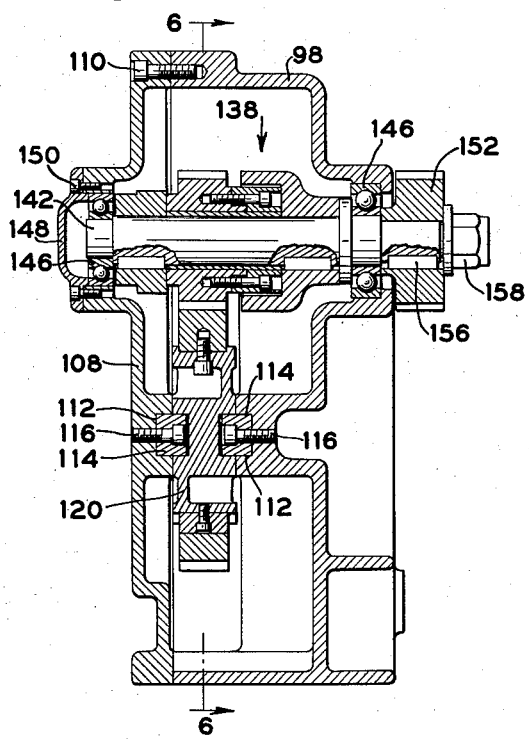

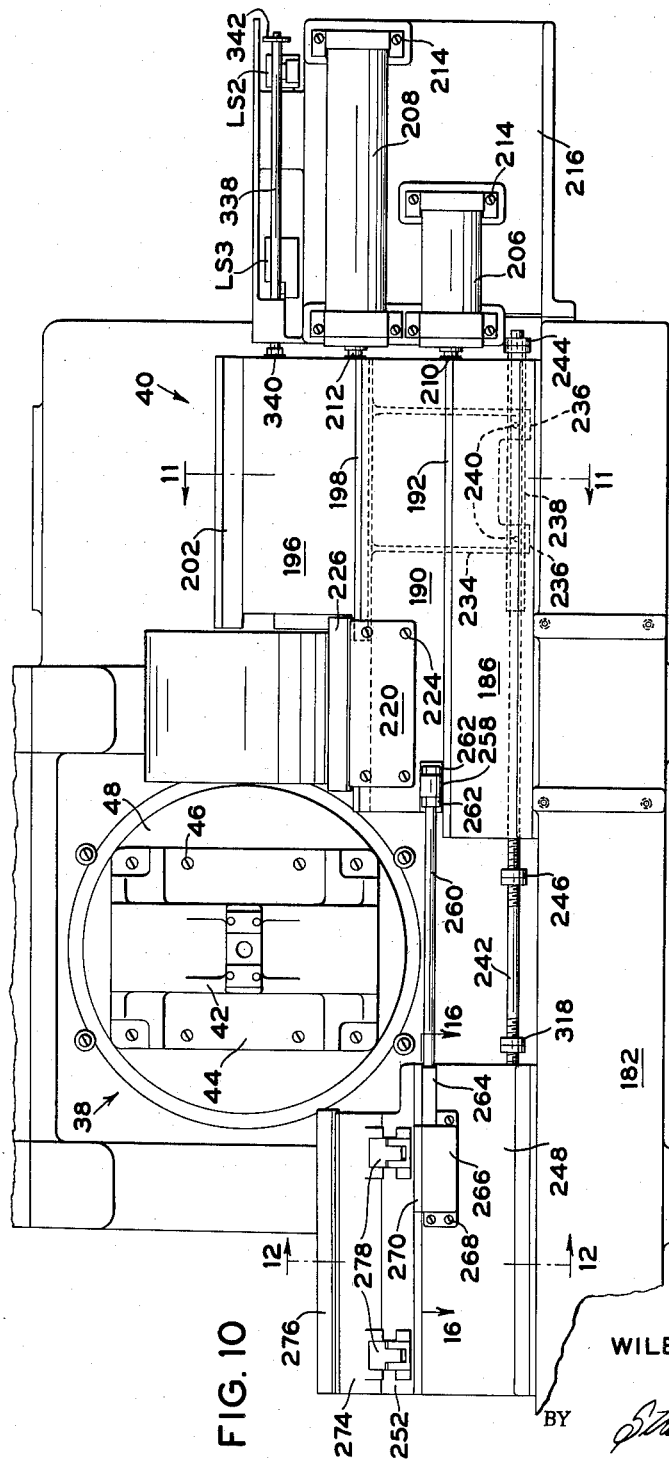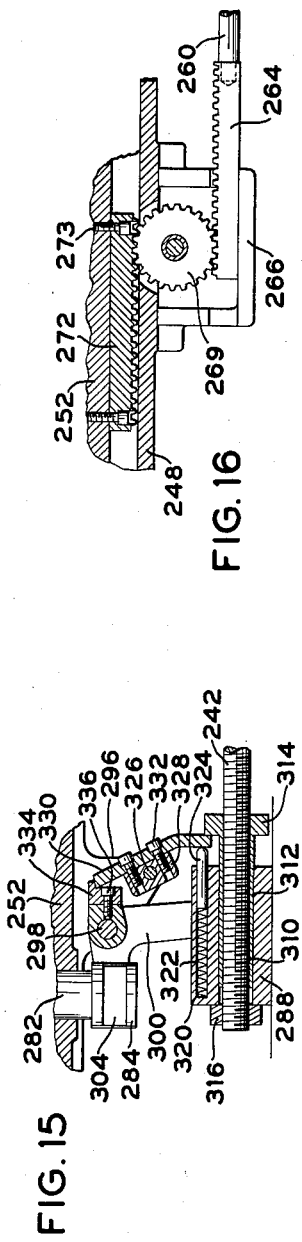

INVENTOR
WILBUR R. BECKNER, JR.

United States Patent Office 2,981,962
Patented May 2, 1961

2,981,962

WORK HANDLING MEANS COMPRISING MOVABLE CHUTE SECTIONS TO ALLOW INDEXING OF WORK CHUCK IN A TAPPING MACHINE

Wilbur R. Beckner, Jr., Waynesboro, Pa., assignor to Landis Machine Company, Waynesboro, Pa., a corporation of Pennsylvania Filed Sept. 8, 1958, Ser. No. 759,446

8 Claims. (Cl. 10—139)

This invention relates to metal working machines and particularly to machines for performing tapping and other cutting operations on tubular members, especially pipe couplings.

The present machine is an improvement upon that shown and described in copending patent application Serial No. 665,963, filed June 17, 1957. In the machine of that application the chuck for holding the work pieces during the tapping operation is mounted on a cylindrical drum for rotation and for transverse movement from the tapping station to a work loading and discharge station as a part of the automatic operating cycle of the machine.

In the improved machine disclosed herein the transverse movement of the chuck from a tapping station to a loading station is eliminated. This is done by constructing and controlling the automatic work feeding means so that the work pieces are delivered to the chuck and removed therefrom while the chuck is at the tapping station, the chuck being rotated 90 degrees from its position for the tapping operation.

By so constructing the machine, a number of important advantages are achieved while retaining all of the advantages and improvements of the machine disclosed in the above-mentioned copending application. As a result of the present invention the cycle time of the machine, that is, the time required to complete a cycle of operation, is substantially reduced, thus decreasing the cost per piece of the finished articles. Additionally, since the chuck drum is not required to slide axially, wear between this member and its journal is reduced, thus maintaining the accuracy of position of the chuck for a considerably longer period without replacement of parts.

As in the copending application, the work pieces are delivered to the chuck with their axes horizontally aligned. As a result the work-transfer mechanism is simpler, has fewer parts and a lower first cost than corresponding mechanisms for machines in which the work pieces are delivered with their axes aligned vertically.

It is an object of the invention to provide an automatically operating machine for performing tapping and similar operations on pipe couplings and the like in which the work pieces are delivered to a working station located at the end of a machining spindle, the axes of the work pieces being initially perpendicular to the axis of the spindle and being aligned with the axis of the spindle by rotation of the work-holding member.

Another object of the invention is the provision of improved automatic work feeding means for operation in timed relation with other mechanisms of the machine.

A further object is to provide such work feeding means to cooperate with work discharge means, the feeding means and the discharge means being disposed on opposite sides of the tapping station to constitute a substantially straight-line path for the work pieces through the machine.

A still further object of the invention is to provide feeding means and discharge means as described above, wherein both means are reciprocable toward and from the intervening chuck to provide space for the chuck to rotate, together with adjustable work stop means for accurately gauging the axial position of a work piece in the chuck.

Further objects and advantages of the invention will be apparent from the following description of an exemplary embodiment thereof and from the accompanying drawings, in which:

Figure 4 is a rear elevation of a portion of the chuck indexing mechanism—a view taken along line 4—4 of Figures 2 and 3;

Figure 5 is a sectional view taken along line 5—5 of Figures 4 and 6;

Figure 6 is a sectional view, similar to Figure 4 but taken along line 6—6 of Figure 5;

Figure 7 is a vertical sectional view taken substantially along line 7—7 of Figure 3 and showing the rear end of the chuck drum with the associated control mechanism;

Figure 8 is a partial sectional view taken along line 8—8 of Figure 7;

Figure 9 is a section taken along line 9—9 of Figure 7 and showing the various types of operating cams employed;

Figure 10 is a front elevation of the lower portion of the machine with magazine removed and showing the work feeding and removing means;

Figure 11 is a partial vertical section taken along line 11—11 of Figure 10;

Figure 12 is a partial vertical sectional view taken along line 12—12 of Figures 10 and 14;

Figure 13 is a partial vertical sectional view taken along line 13—13 of Figure 14;

Figure 14 is a partial vertical sectional view taken substantially along line 14—14 of Figure 12;

Figure 15 is a fragmentary sectional view taken along line 15—15 of Figure 12;

Figure 16 is a fragmentary sectional view taken along line 16—16 of Figure 10;

Figure 1:
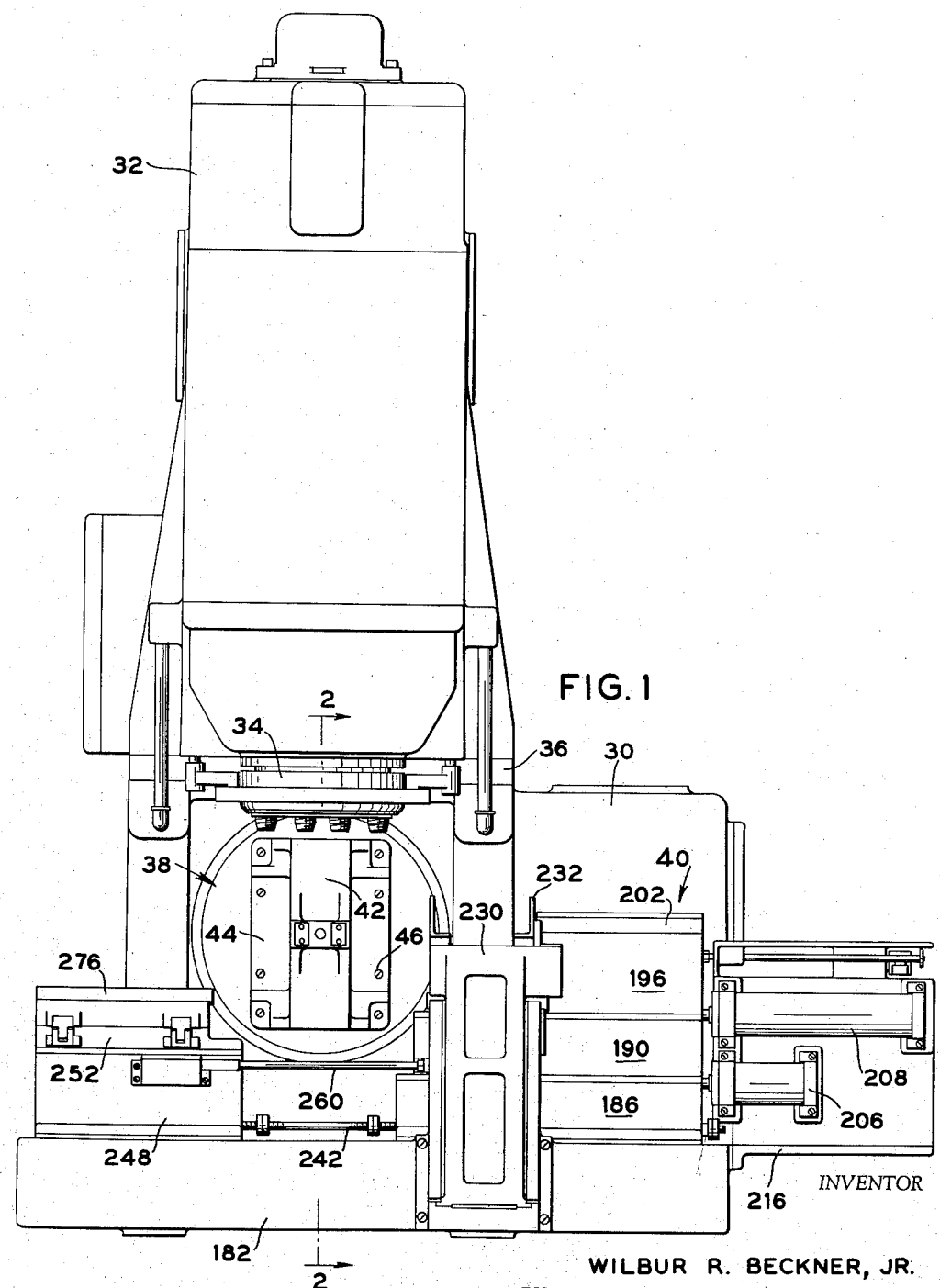
Figure 1 is a front elevation of the assembled machine.

As shown in Figure 1, the machine comprises two main sections, the bed 30 and the headstock 32 mounted on the bed. The machine is vertically arranged, that is to say the operating spindle enclosed in the headstock 32 is positioned with its axis vertically aligned and terminates in the collapsible tap 34. Since the novel features of this invention are confined to mechanism associated with the bed 30 and the operating circuit and since the mechanism contained in the headstock 32 may be the same as that shown and described in the above-mentioned copending application, the headstock will not be further described here. Installed between the headstock 32 and bed 30 is an intermediate float plate 36, the construction and function of which is also described in the copending application.

The axis of the spindle and the attached tap 34 is disposed perpendicular to the horizontal axis of a chuck, indicated generally by 38, for receiving the work pieces and presenting them to the tap for the thread cutting operation. As will be described more fully below, the chuck 38 is rotatable, so that the work pieces may be introduced into the chuck with their axes horizontal, whereupon the chuck closes and indexes 90 degrees to turn the work piece axis into a vertical plane, thus aligning it with the spindle axis. The work pieces are fed one at a time to the chuck 38 by a loading mechanism 40 extending across the front of the machine.

The chuck

Figure 2:
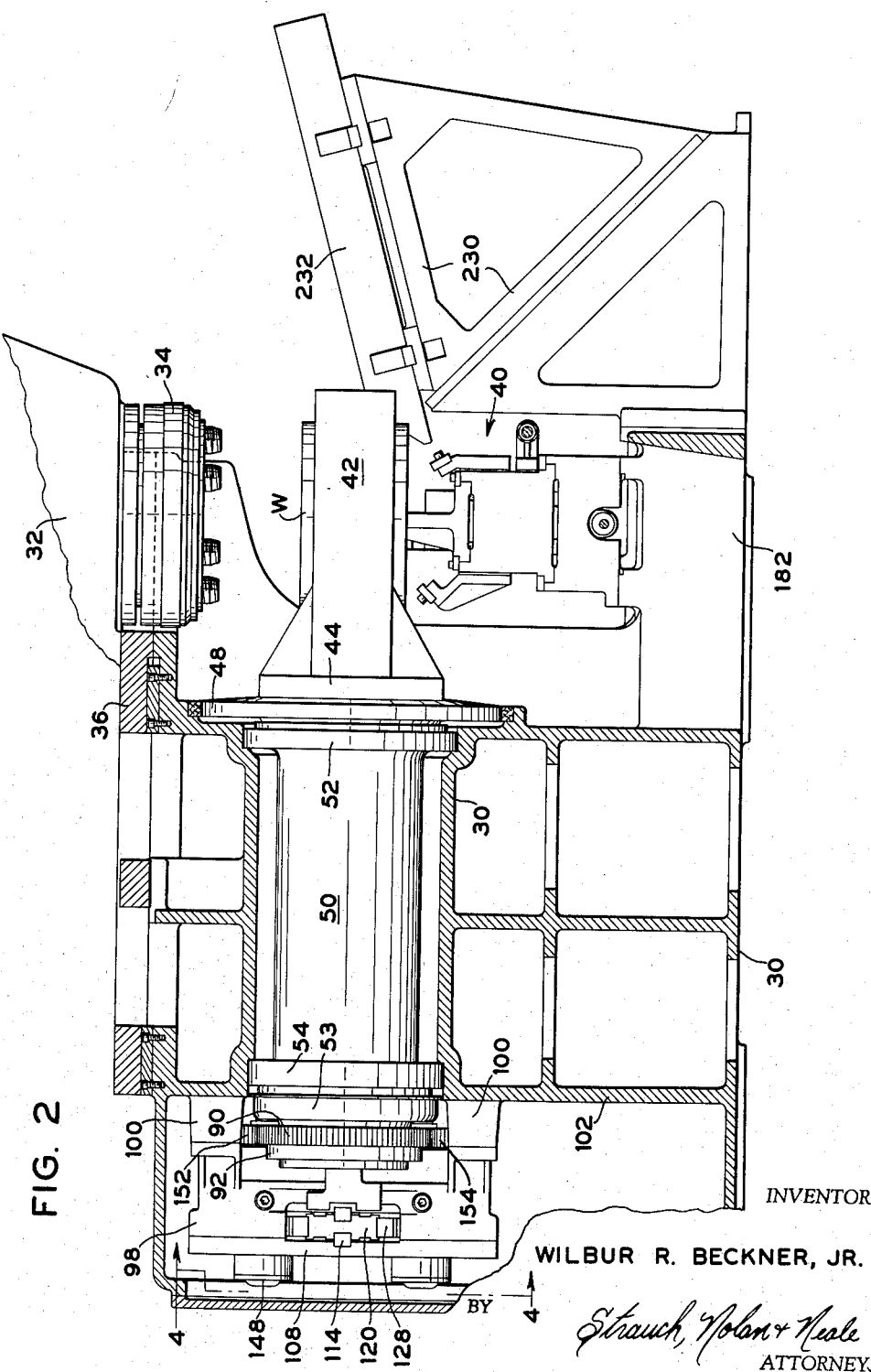
Figure 2 is a vertical section through the bed of the machine, taken along line 2—2 of Figure 1 and showing the work-holding chuck rotated 90° from the position of Figure 1.
Figure 3:
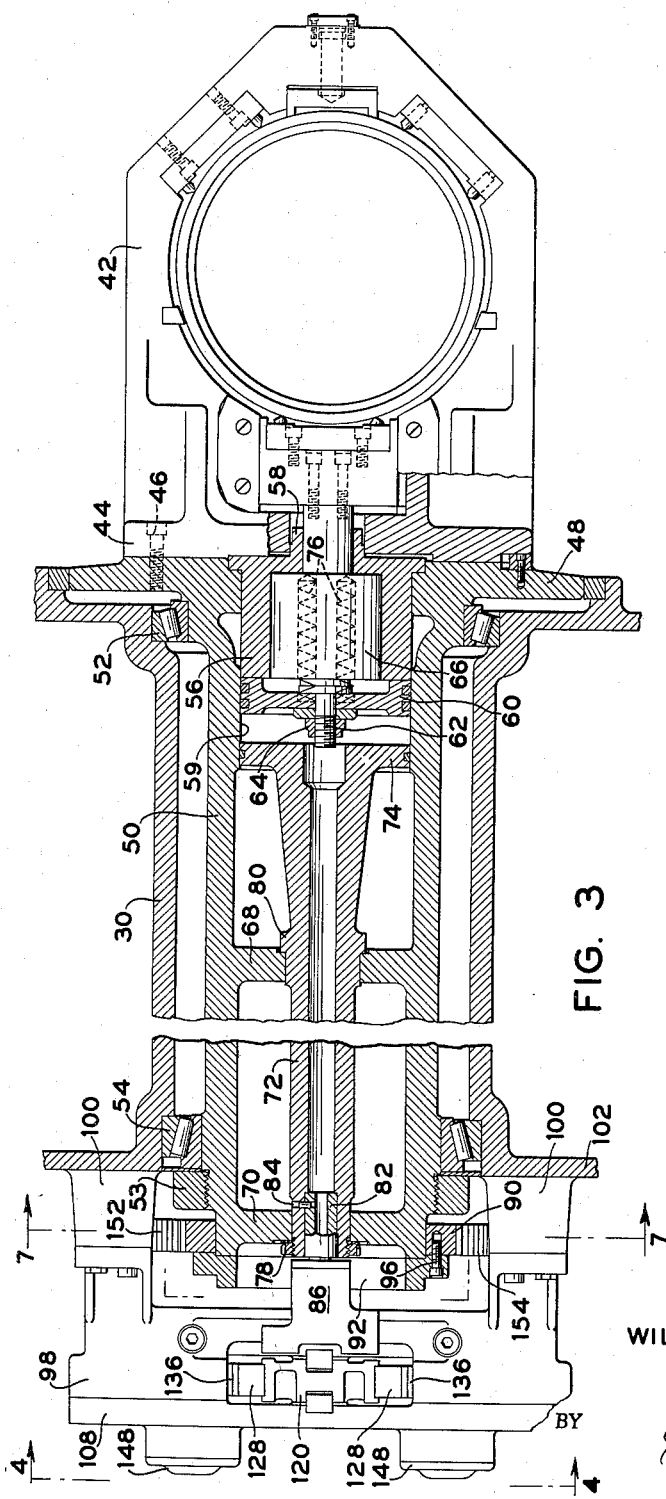
Figure 3 is a vertical section through the chuck drum, also taken along line 2—2 of Figure 1.

A chuck body 42, shown in Figures 1, 2 and 3, contains the usual grips for opening and closing to release and seize the work pieces. The above-mentioned copending application may also be referred to for a disclosure of the details of construction of such a chuck body which is here provided with a rectangular flange 44 for attachment, as by means of screws 46 (Figure 10) to a larger flange 48. The flange 48 constitutes the integral forward end of a chuck drum 50 mounted in the bed 30 (Figures 2 and 3), for rotation upon anti-friction bearings 52 and 54. A nut 53 is threaded upon the rear end of drum 50 to retain it in axial position.

The drum 50 is hollow to receive and support the mechanism for opening and closing the chuck grips. A cyindrical member 56 is mounted in the forward end of the drum 50 and has a reduced-diameter boss 58 extending into a corresponding recess in the rear portion of the chuck body 42 to center the latter accurately with respect to the chuck drum 50. Rearwardly of the cylindrical member 56, a portion of the interior of the chuck drum 50 constitutes an air cylinder 59 containing a piston 60 which is connected by a threaded rod 62 and nut 64 to an intermediate member 66. The member 66 is mounted within the cylindrical member 56 and is connected at its forward end to one of the chuck grips. Thus reciprocating movement of the piston 60 causes a similar movement of the chuck grip to which it is attached to open and close the chuck. The intermediate member 66 preferably contains a force-multiplying device as disclosed for example in the above-mentioned copending application.

The chuck drum 50 is provided in its interior with webs 68 and 70 to provide a support for a centrally disposed tubular member 72. The forward end of the tube 72 has an integral flange 74 forming the rear wall of the air cylinder 59. Air supplied through the interior of the tube 72 will force the piston 60 forward against the rear surface of cylindrical member 56 to close the chuck grips. Release of the air pressure will permit the piston 60 to move rearwardly against the forward surface of the flange 74 under the influence of springs 76 disposed in recesses in the intermediate member 66, the spring being compressed by the piston 60 during its forward movement. A lock nut 78 is threaded on the rear extremity of the tubular member 72 to hold an integral shoulder 80 firmly again the median web 68.

Figure 17:
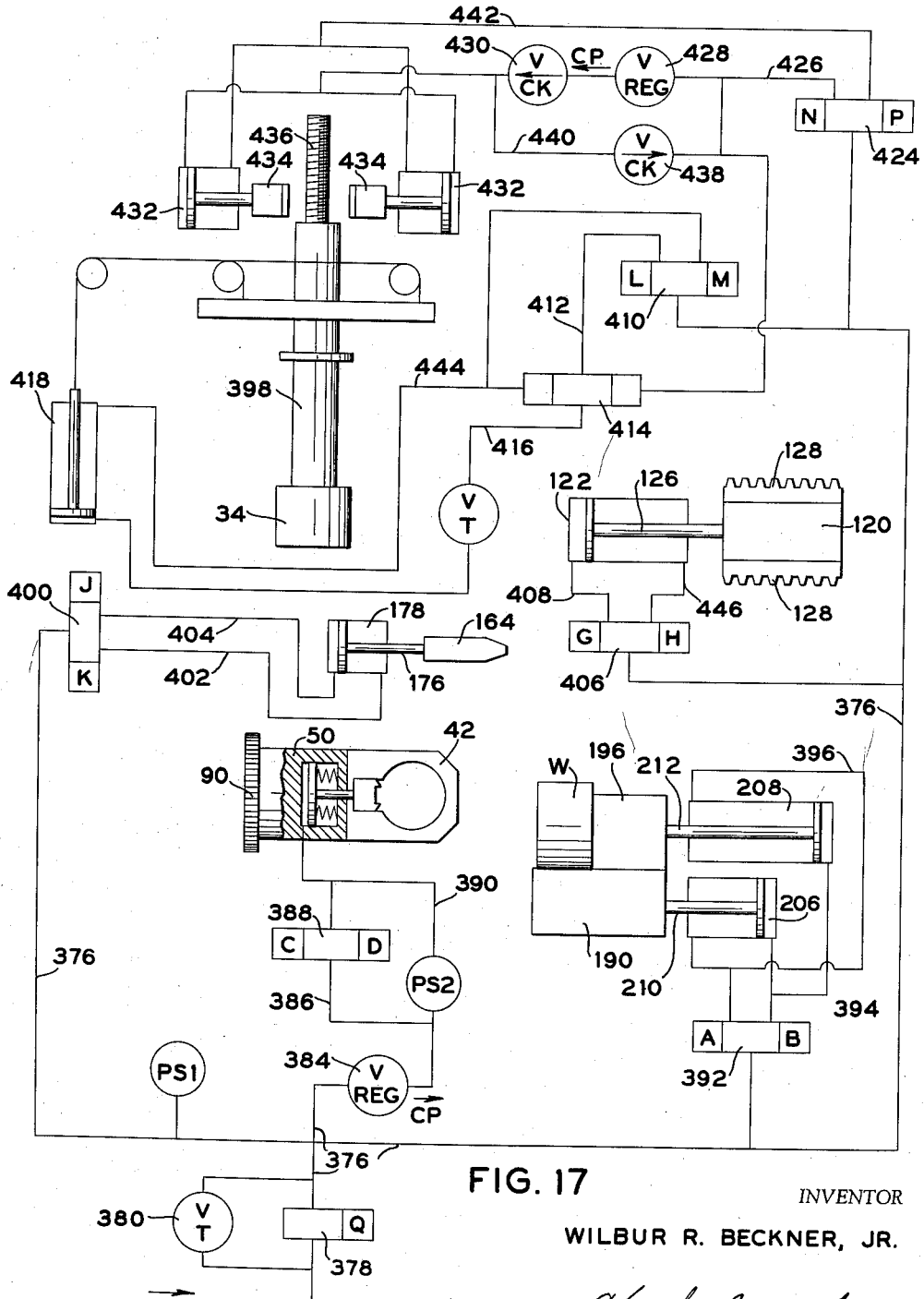
Figure 17 is a schematic representation of the pneumatic operating circuit employed in the machine.

A bushing 82 is supported in the rear end of the tube 72 and is secured therein by a pin 84 (Figure 3). An integral, reduced-diameter portion of bushing 82 (Figure 8) projects rearwardly therefrom and is surrounded by a connector 86. A passage 88 is provided in the connector 86 through which air under pressure may be introduced into the interior of tube 72 whence it is conveyed to the chuck operating cylinder 59. The line between connector 86 and a source of compressed air is not shown in the drawing but is indicated on the operating diagram, Figure 17.

The chuck index

The chuck drum 50 is made rotatably indexible to four positions, 90 degrees apart. Thus the chuck may be positioned with its axis extending vertically and with either face opposed to the tap 34 for tapping the opposite ends of a pipe coupling as shown in Figure 2. It may also be positioned with its axis extending horizontally as shown in Figure 1 to receive a work piece as presented by the loading mechanism 40. For this purpose a ring gear 90 (Figures 2 and 3) and a control ring 92 are mounted on the rear end of the chuck drum 50. The control ring 92 is attached to the chuck drum 50 by screws 94 (Figures 7 and 8) while the ring gear 90 is secured to the control ring 92 by means of screws 96 (Figures 3 and 7).

As shown in Figures 2, 3, 4 and 6, a large housing 98 for the chuck indexing mechanism is mounted upon platforms 100 formed integrally with a vertical partition 102 of the bed 30 and is secured on said platforms by screws 104 and locating pins 106. A cover 108 is provided for the housing 98 and is attached thereto by means of screws 110. Keyseats 112 extend longitudinally in the housing 98 and in cover 108 and are occupied by a pair of opposed guide keys 114 which are secured in the seats by screws 116 (Figure 5). It will also be noted that the connector 86 to the pneumatic line is secured to the housing 98 by screws 118 (Figure 6).

A slide 120 (Figures 3, 5 and 6) is disposed for longitudinal sliding movement between the two guides 114. The movement of slide 120, in a direction perpendicular to the axis of chuck drum 50 is effected by a pneumatic cylinder 122 which is attached by screws 124 to the housing 98 (Figure 4), the piston rod 126 being threadedly engaged in the outer end of the slide 120. Upon each of the top and bottom sides of slide 120, a rack 128 is attached by means of screws 130. A key 132, secured by a screw 134 to the slide 120, is provided for each rack 128 to prevent any independent longitudinal movement of the racks relative to the slide.

As shown in Figures 5 and 6, both racks 128 are in meshing engagement with spur gears 136 which constitute parts of a pair of ratcheting devices 138 and 140 mounted respectively on shafts 142 and 144. The shafts 142 and 144 are rotatably journalled in bearings 146 seated in openings in the housing 98 and cover 108, caps 148 with screws 150 being provided to close the openings in cover 108. The shafts 142 and 144 extend forwardly from the housing 98 and have spur gears 152 and 154 respectively, secured thereon for unitary rotation by keys 156 and against relative axial movement by nuts 158 threaded upon the forward ends of the shafts. Forwardly of the housing 98, the gears 152 and 154 are in constant mesh with the ring gear 90 for rotating the chuck drum 50.

The ratcheting devices 138 and 140 are similar to that shown and described in copending application Serial No. 665,963 and are, per se, a known expedient for translating rectilinear reciprocating motion into unidirectional rotary motion. In accordance with conventional practice the devices 138 and 140 are so arranged that during the forward stroke of the slide 120 with racks 128, the device 138 causes rotation of ring gear 53 in the clockwise direction as seen in Figures 6 and 7 while the device 140 ratchets freely. During the return stroke of the slide 120 the reverse is true. That is, the device 140 causes clockwise rotation of the ring gear 53 while the device 138 ratchets freely. Thus the gear 53 and with it the chuck drum 50 is rotated in the same direction when the slide 120 is moved in either direction and an idle return stroke, present in the copending application, is eliminated. The length of stroke of the cylinder 122 and thus of the slide 120 is made such that the chuck drum 50 will rotate 90 degrees for each stroke of the slide or 180 degrees for each complete reciprocation.

In order to locate the chuck drum precisely at the end of each 90 degree rotation, the control ring 92 is provided with four equally spaced recesses 160 (Figure 7) each lined with a pair of wear inserts 162 which may be secured in place in the control ring 92 by means of screws (not shown). At each of the four stationary positions of the chuck body 42, one of the recesses 160 is so positioned as to be engageable by a lock bolt 164 (Figures 7 and 8) T-shaped in cross-section and mounted in a rectangular slideway 166 which is secured by screws 168 to a raised portion 170 of the bed partition 102. The lock bolt 164 is retained in the slideway 166 by gibs 172 and screws 174 and has screwed into its outer end the piston rod 176 of a pneumatic cylinder 178 also secured upon portion 170 by screws 180. Thus operation of the cylinder 178 will effect the engagement of the lock bolt 164 with one of the recesses 160 or its disengagement therefrom.

The work loading mechanism

Referring now to Figure 2, it will be seen that the bed 30 has an integral forward extension 182 beneath the chuck body 42 to support the work loading mechanism 40, illustrated in greater detail in Figures 10 through 15. The extension 182 is provided on the right side as seen in Figure 1 with spaced horizontal flat surfaces 184 (Figure 11) upon which a bracket 186 is secured by screws 188. The top of bracket 186 is recessed to form a slideway for a sliding bracket 190 which is retained upon the bracket 186 by means of gibs 192 and screws 194. The top of sliding bracket 190 also is recessed to receive a work pusher bracket 196, also slidably retained on sliding bracket 190 by gibs 198 and screws 200. A plate 202 for engaging the ends of work pieces extends laterally from the top of pusher bracket 196 and is attached thereto by screws 204.

The bracket 190 and pusher bracket 196 are reciprocated by pneumatic cylinders 206 and 208 respectively, to which they are connected by means of the piston rods 210 and 212 respectively. Both cylinders 206 and 208 are secured by screws 214 to a stationary bracket 216 attached to the right side of the bed 30 by screws 218 (Figures 1 and 10). A pair of brackets 220 and 222 (Figure 11) are secured by screws 224 to the front and rear sides respectively of the sliding bracket 190. A work support plate 226 is attached by screws 228 to each of the brackets 220 and 222 and are so arranged as to receive a work piece upon their upper edges. The work pieces may be delivered to a position upon the plates 226 by any convenient means, that shown in Figures 1 and 2 comprising a magazine 230 having angle-iron channels 232.

As shown in Figures 10 and 11, the pusher bracket 196 has a portion 234 depending downwardly therefrom through the sliding bracket 190 into the bracket 186 where it terminates in two aligned bosses 236 having a tube 238 secured therein by screws 240. A threaded rod 242 is passed through the tube 238 and is provided with a pair of adjustable stop nuts 244 and 246 on the right and left sides, respectively, of the tube 238 as seen in Figure 10.

Another bracket 248 (Figures 10 and 12) is affixed upon the left side of extension 182 in a manner similar to that of bracket 186. The bracket 248 is hollow and is provided with a shelf 250 along each interior side wall to support a slide 252 which is retained in its slideway by gibs 254 and screws 256 (Figure 13). The right hand slide 190 described above has attached to its forward surface a boss 258 (Figures 10 and 11). A rod 260 is passed through the boss 258 and is retained therein by means of lock nut 262. The rod 260 extends leftward toward the bracket 248 and has a rack 264 affixed to its left end. The rack 264 extends into a small housing 266 secured to the front slide of bracket 248 by screws 268 and having a cover 270.

The housing 266 has mounted therein a small, ordinary spur pinion 269 meshing with the rack 264 and a similar rack 272 (Figure 13) on the opposite side of the pinion and secured in the side of the slide 252. It is evident then that movement of the sliding bracket 190 in either direction will cause the rack 264 to rotate the pinion 269 to move the rack 272 and with it the left hand slide 252 in the opposite direction. For example, if the slide 190 is moved toward the center of the machine, the slide 252 is also caused to approach the center of the machine from the opposite side.

A work support consisting of a bracket 274 and attached blades 276 rests upon the flat top surface of the slide 252. This device serves to support the work piece as it leaves the chuck after being threaded and also as a stop to locate the unthreaded work piece being transferred into the chuck upon the slide 190. For the latter purpose the bracket 274 is raised above the rest position shown in Figures 12 and 13 into the path of the work piece being inserted into the chuck and later lowered again to the position shown. To permit such movement the bracket 274 is connected to the slide 252 by a pair of simple linkages 278 on each side (Figure 10, 12 and 13) and is secured by a screw 280 to the top of a shaft 282, journalled for vertical reciprocating movement in a suitable bore in the slide 252. A head 284 projecting downwardly into the interior of bracket 248 limits movement of the shaft 282 in the upward direction.

The bracket 274 is urged upwardly into work engaging position by a pair of compression springs 286, vertically directed, seated in recesses in the slide 252 and also engaged in aligned recesses in the bracket 274. This bracket is normally held in contact with the top surface of slide 252 and the springs 286 are held compressed by a "load and fire" mechanism including a block 288 (Figures 12, 14 and 15). The bracket 248 has a web 290 across the bottom thereof formed with a longitudinal channel 292 of inverted T-shape to engage lateral flanges 294 on the block 288 and thus restrain the block against vertical movement.

A pair of depending lugs 296 (Figures 12–14) are formed integrally with the slide 252 to support a shaft 298. A bell crank lever 300 is journalled for rocking movement upon shaft 298 and between the lugs 296. The lever 300 is bifurcated as shown in Figure 12 so that each of its lever arms becomes a pair of arms. The shorter, substantially horizontal pair of arms of lever 300 carries a pair of pins 302, the square heads of which are engaged in rectangular slots 304 in opposite sides of the head 284 of shaft 282. The longer, substantially vertical pair of arms of lever 300 carries a pair of pins 306 whose square heads are engaged in vertically directed rectangular slots 308 in the block 288. This connection between the block 288 and the shaft 282 will cause the latter to move vertically upon a horizontal sliding movement of the block 288.

A longitudinal bore 310 in the block 288 is occupied by a bushing 312 having a flange 314 on the right end as seen in Figures 14 and 15. The rod 242, described above extends through the bushing 312 and carries a nut 316 which will permit the rod 242 to move to the left relative to the block 288 but will limit such relative movement in the opposite direction. Another pair of nuts 318 is mounted on the rod 242 between the block 288 and the nuts 246.

Above the bore 310 the block 288 is provided with a cylindrical recess 320 containing a compression spring 322 and a detent 324. A second shaft 326 extends between the lugs 296 and has pivotally mounted thereon a block 328. A latch member 330 is secured to the block 328 by screws 332 and extends downwardly into a position to be engaged by the detent 324 and/or the flange 314 of bushing 312. A latch seat 334 is attached by screws 336 to engage the latch member 330, thus preventing rotative movement of the lever 300 when the parts are in the position shown in Figure 15.

Control devices

Figure 18:
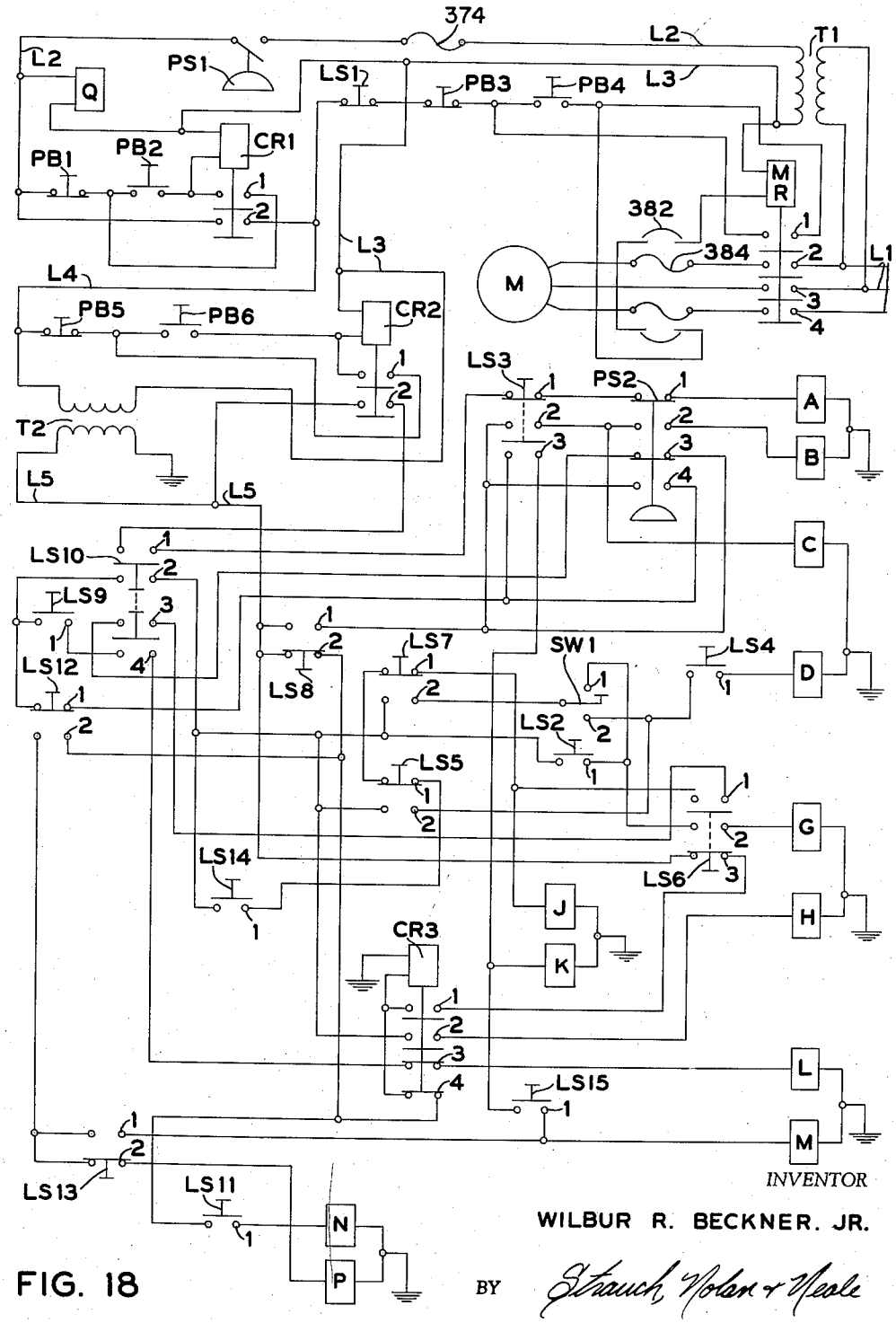
Figure 18 is a diagram of the electrical control circuit used in the machine.

The primary control means for effecting the automatic operation of the machine consists of limit switches operated by the various moving parts. Certain of these switches are shown only on the diagram of the electrical circuit of the machine, Figure 18, and are operated by mechanism in the headstock 32 in a manner similar to that shown and described in the above-mentioned copending application. For convenient reference, the numbers of the corresponding limit switches in the aforesaid copending application Serial No. 665,963 are indicated in parentheses where applicable. These limit switches are: LS1, (LS15) located so as to be actuated when the spindle moves too far down to stop the spindle rotation and thus constituting a safety switch; LS8, (LS4) held in actuated position when the spindle is at rest at the top of its stroke; LS11, (LS5) actuated momentarily in the downward travel of the spindle to cause the leadscrew nuts to close and not actuated on the return or upward stroke of the spindle; LS12, (LS2) actuated upon collapse of the tap 34; LS13, (LS1) actuated by the movement of the leadscrew nuts and LS15, (LS3) actuated during the upward travel of the spindle as it nears the top of its stroke and just before actuation of LS8.

As shown in Figure 10, a rod 338 is threaded into the right hand end of pusher bracket 196 and is secured thereto by a nut 340. The rod 338 extends substantially through the length of bracket 216 and has a washer 342 attached to its outward end. A pair of limit switches LS2 and LS3 are mounted upon bracket 216 for actuation by the washer 342 in the reciprocating movement of the pusher 196 relative to the stationary bracket 216. The limit switch LS3 is operated in the normal manner when the pusher 196 has reached the limit of its movement inwardly, i.e. toward the chuck, while LS2 is operated just before the pusher 196 reaches the opposite end of its travel and in its outward stroke only, LS2 being the well-known type of limit switch which will permit the operator 342 to pass in the inward direction without actuation.

As shown in Figures 4 and 6, a metal strip 344 is attached as by screws 346 to the outer end of the upper rack 128 and has a bent end to actuate limit switches LS6 and LS14 at the outer and inner ends, respectively of the travel of the rack. Both LS6 and LS14 are secured by suitable brackets and screws to the bed partition 102.

A trip bracket 348 is secured by screws 350 to the outer end of lower rack 128 and is provided with a recess 352. A tripping finger 354 is rockably mounted in recess 352 upon a pin 356 and is retained in the recess by a strip 358 secured to bracket 348 by screws 360. The finger 354 is prevented from rotating in the counterclockwise direction by one wall of the recess 352 and is abutted on the opposite side by a detent 362 slidably mounted in a suitable bore in the bracket 348 and urged by a spring 364 into constant contact with the finger 354. The spring 364 is partially embedded in the detent 362 and is retained therein by a plug 366 threaded into the end of the bore in bracket 348. A limit switch LS4 is mounted nearby to be operated by the finger 354 and is secured to the bed partition 102. Thus the switch LS4 will be actuated in the outward travel of the lower rack 128 but will not be actuated in the inward travel of the rack since the finger 354 will rotate upon contact with the switch. Switch LS4 is positioned so as to be actuated momentarily by the finger 354 just before the rack 128 reaches the end of its stroke in the outward direction.

Referring now to Figure 7, three limit switches LS5, LS7 and LS9 are mounted in the usual manner on the bed partition 102 and have their operating levers extending inwardly so as to lie adjacent to the control ring 92. The ring 92 has affixed thereto, by screws 368 three cams 370, 372 and 374, shown in Figures 7 and 9. Each of the limit switches should be mounted at a different level so as not to be operated by all of the cams 370, 372 and 374. The cam 370, intended to operate both switches LS5 and LS9 has two projections, one at the level of each switch, as shown in Figure 9. Cam 372 is intended to operate switch LS7 only and consequently its projection is located at the level of that switch. The same is true of cam 374 which operates only switch LS9. The correct angular location of the cams 370, 372 and 374 will be apparent from the description of the operation of the machine to follow.

The limit swtich LS10 (Figure 7) is screwed to a plate 370 which is attached by screws 372 to one of the lock bolt gibs 172. This switch is operated exactly like the corresponding switch disclosed in the above-mentioned copending application, that is, it is operated in one direction by the movement of the lock bolt 164 as it seats itself in one of the notches 160 and again in the opposite direction as the lock bolt withdraws from the notch.

Operation

The completely automatic operation of the machine is effected by an electrical control system in conjunction with a pneumatic system which provides the power for moving the various parts. These are shown diagrammatically in Figures 18 and 17 respectively. Power is supplied from the 3-phase alternating current lines L1. The primary coil of a transformer T1 is connected across two of the lines L1 to reduce the line voltage to a convenient control voltage for use with relays. The control lines leading from the secondary coil of the transformer T1 are designated L2 and L3. In line L2 are connected a fuse 374 and a pressure switch PS1. The latter is also installed in the main air pressure line 376 so that the contacts of switch PS1 are closed whenever working pressure is available in line 376.

Compressed air is supplied to the system from line 376 which passes through a solenoid-operated cut-off valve 378. The solenoid Q of the valve 378 is connected across the lines L2 and L3 and thus is energized to open the valve whenever power is supplied to lines L1. A metering valve 380 is installed in a branch line by-passing the valve 378 for the purpose of allowing the pressure in the system to build up gradually to the value required to operate switch PS1 to energize solenoid Q and thus open line 376 fully. It has been found that a sudden surge of air under pressure into the system sometimes changes the position of the valves, disturbing the cycle of operation. Now with the switch PS1 closed and solenoid Q energized, control voltage exists between lines L2 and L3 and the push button switch PB2 may be pressed to close the circuit L3, CR1, PB2, PB1, L2 thus energizing the relay CR1 and closing CR1–1 and CR1–2, the two pairs of contacts associated with relay CR1. The contacts CR1–1 are connected to by-pass the start button PB2 and to close the holding circuit L3, CR1, CR1–1, PB1, L2 maintain the relay CR1 in energized condition when the switch PB2 is released. The contacts CR1–2 are installed between control line L2 and its continuation L4 so that current cannot pass into any other elements of the system unless relay CR1 is closed. From this point forward, control voltage exists between lines L3 and L4.

The system may include a normally closed limit switch LS1 which is a safety switch to be opened upon accidental over-travel of the spindle 90 in the downward direction. As will be seen later herein, actuation of the switch LS1 will have the effect of stopping the spindle rotation. The limit switch is connected in series with stop and start push button switches PB3 and PB4, motor relay MR and a pair of overload circuit breaking contacts 382 the terminal elements of which are installed in two of the power lines L1.

Next in operation of the machine the switch PB4 is pressed to close the circuit L3, MR, 382, PB4, PB3, LS1, L4, energizing the relay MR and closing the four pairs of normally open contacts associated therewith. The contacts MR–1 bridge the push button switch PB4 and, when closed, close the circuit L3, MR, 382, MR1, PB3, LS1, L4 constituting a holding circuit for relay MR when switch PB4 is released. The remaining contacts MR–2, MR–3 and MR–4 are installed in the power lines L1 and, when closed, set the motor M in operation, thus rotating the spindle in well known manner.

The cycle start button PB6 is now pressed, closing the circuit L3, CR2, PB6, stop button PB5, L4 to energize the control relay CR2 and close the two pairs of contacts CR2–1 and CR2–2 associated therewith. Contacts CR2–1 bridge the switch PB6 and close a holding circuit for relay CR2.

Lines L3 and L4 terminate in the primary winding of a transformer T2 which is employed to reduce the control voltage to a convenient value for operating the solenoid-operated valves in the remainder of the system. In the example shown, approximately 8 volts is employed. If the solenoids used operate at 110 volts, the transformer T2 can be eliminated but return lines must be provided for the electrical system instead of grounding the lines as shown. Beyond the secondary coil of the transformer T2 the main control line is designated L5.

A branch of the air supply line 376 leads through a pressure regulating valve 384, line 386 and a solenoid-operated four-way valve 388 to the line 390, the tube 72 and the air chamber in the drum 50. A pressure switch PS2 is connected in line 390 between the valve 388 and the tube 72 for actuation whenever air pressure exists at this point. Four sets of contacts are associated with the pressure switch, contacts PS2–1 and PS2–3 being closed when the switch is not under pressure and conversely for contacts PS2–2 and PS2–4. At the start of the cycle no pressure exists at PS2, wherefore the contacts PS2–2 and PS2–4 are open.

Since the work loading carriage constituted by the sliding bracket 190 and the pusher 196 (Figure 10) is in its starting position, the limit switch LS3 is not actuated and its contacts LS3–1 are closed. Since the lock bolt 164 is seated in one of the recesses 160, the limit switch LS10 is closed on contacts LS10–1 and LS10–4 while contacts LS10–2 and LS10–3 are open. Then with contacts PS2–1 and CR2–2 closed as described above, the circuit L5, CR2–2, LS10–1, LS3–1, PS2–1, solenoid A, ground is closed, energizing solenoid A.

Solenoids A and B are associated with a four-way valve 392 which is also connected to the air supply line 376. When solenoid A is energized the valve 392 is operated to pass air through line 394 to the head ends of both cylinders 206 and 208 and to open the rod ends of the cylinders to exhaust through line 396. The energization of solenoid A therefore causes the piston rod 210 of cylinder 206 to move the sliding bracket 190 toward the left as seen in Figure 10 and consequently toward the chuck 42. The rod 260 is also moved toward the left wherefore, as described above, the left hand slide 252 is also caused to move toward the chuck.

At the same time the piston rod 212 of cylinder 208 moves the pusher bracket 196 toward the chuck and when the piston rod 210 reaches the end of its relatively short stroke, the pusher bracket 196 continues to move, pushing the work piece from its position upon the work support plates 226 into the central opening in the chuck body. Simultaneously, the tube 238 is also carried leftward by the bosses 236 which are integral with the pusher bracket 196. In this movement the nuts 246, mounted on rod 242, are contacted by the end of tube 238 and thus the same movement is imparted to the rod 242. Eventually the nuts 318, also mounted on rod 242, engage the flange 314 of the bushing 312 (Figures 14 and 15) compressing the spring 322 and rocking the latch member 330 in the clockwise direction to disengage it from its seat 334. This permits the bell crank lever 300 to rotate in the clockwise direction, freeing the springs 286 to lift the work support bracket 274. The bracket 274 is thus interposed in the path of the work piece advancing into the chuck 42 from the opposite side thereof and consequently the right hand end of the work support blades 276 serves as a work stop to correctly position the work piece in the chuck. The piston rod 212 reaches the end of its stroke just before the work piece engages the stop 276 and the momentum of the work carries it into contact with the stop. During this movement the plate 202 on bracket 196 passes by the delivery end of the magazine channels 232, thus holding the stack of work pieces in the magazine.

The finished work piece left in the opened chuck by the preceding operation is pushed out of the chuck by the advancing unthreaded work piece onto the work support blades 276 before the latter are raised to serve as a work stop.

As the bracket 196 reaches the end of its workfeeding stroke, the washer 342 on rod 338 actuates the limit switch LS3, opening the contacts LS3–1 and closing contacts LS3–2 and LS3–3. Consequently the above-mentioned circuit through solenoid A is opened and the solenoid is de-energized. Since the spindle is in its upper position at the start of the cycle, the limit switch LS8 is in its actuated position with contacts LS8–1 closed and contacts LS8–2 open. Thus the circuit L5 is energized through contacts LS8–1, LS3–2, solenoid C and ground, energizing solenoid C.

Solenoid C opens the valve 388 to permit air under pressure to enter the line 390, the tube 72 and the air chamber in drum 50 as explained above. The piston 60 is consequently displaced to close the grips upon the work piece in the chuck. The valve 384 is provided in the line 386 leading to the chuck operating cylinder in order to be able to regulate the pressure applied to the work piece. As is well known in the art, this pressure is increased if the cutting torque is increased and decreased if thin-walled tubing is being operated upon to avoid squeezing the work out of round.

The presence of air under pressure in line 390 operates the pressure switch PS2 to open contacts PS2–1 and PS2–3 and close contacts PS2–2 and PS2–4. That is to say, the switch PS2 is actuated only after the work piece has been gripped. This closes the circuit L5, LS8–1, PS2–4, LS3–3, solenoid K, ground, energizing solenoid K. The energization of solenoid K shifts the valve 400 connecting the supply line 376 to the line 402 and the rod end of cylinder 178, thus withdrawing the lock bolt 164 from the recess 160 to allow the drum 50 to rotate. At the same time the line 404 is connected to exhaust.

The withdrawal of the lock bolt 164 reverses the position of the contacts of limit switch LS10, opening contacts LS10–1 and LS10–4 and closing contacts LS10–2 and LS10–3, thus closing a circuit L5, LS8–1, LS3–2, PS2–2, solenoid B, ground to energize solenoid B. The energization of solenoid B operates the valve 392 to permit air pressure to enter the rod ends of cylinders 206 and 208 through the line 396 and to permit the head ends of the cylinders to exhaust through line 394. As a result the sliding bracket 190 and the pusher 196 are withdrawn toward the right as seen in Figure 10, and slide 252 is withdrawn to the left.

At the same time the bosses 236 on the portion 234 of pusher bracket 196 carry the tube 238 toward the right until it contacts the nuts 244. Thereafter the rod 242 is also moved axially toward the right and the nut 316 on the opposite end of rod 242 draws the block 288 a short distance in the same direction. The sliding block connection between block 288 and the bell crank lever 300 causes the latter to rotate counterclockwise into the position shown in Figures 14 and 15. In this position the spring 322 expands to re-establish engagement between the latch 330 and its seat 334 and at the same time the work stop 274—276 is lowered, compressing the springs 286. Also the plate 202 is withdrawn from its position in front of the delivery channels 232, permitting another work piece to roll from the magazine onto the plates 226.

As the loading slides begin the withdrawal movement, the limit switch LS3 is released by the washer 342, opening LS3–2 and LS3–3 and closing LS3–1. Thus the circuits through solenoids B, C and K are opened and those solenoids are de-energized. Since, at this point in the cycle the chuck indexing mechanism is as the position shown in Figures 4 and 6, the limit switch LS6 is held in its actuated position by strip 344 to maintain contacts LS6–3 open and to maintain contacts LS6–1 and LS6–2 closed. Also, since the tap is set to cut a thread, the limit switch LS12 is not actuated and its contacts LS12–2 are open and contacts LS12–1 are closed. Just before the loading slides reach the end of their return movement, the limit switch LS2 is momentarily actuated by the washer 342, closing its single pair of contacts LS2–1. This closes the circuit L5, LS8–1, PS2–4, LS12–1, LS10–2, LS2–1, LS6–2, solenoid G, ground, energizing solenoid G.

The solenoid G operates the valve 406, which is connected to the air supply line 376, to permit air under pressure to pass through line 408 and enter the head end of cylinder 122. This causes the slide 120 with the racks 128 to be extended and, as explained above, the upper rack 128 operates the ratcheting device 138 to cause rotation of the ring gear 53 in the clockwise direction as seen in Figures 6 and 7. Consequently, the chuck 42 rotates 90 degrees, disposing the work axis vertically and in alignment with the axis of spindle 398 and tap 34.

The extension of slide 120 causes the strip 344 to release limit switch LS6, opening contacts LS6–1 and LS6–2 and closing LS6–3. This opens the circuit through the solenoid G, de-energizing it. With the chuck in its initial or loading position the cam 370 (Figure 7) actuates limit switch LS5. Now as the chuck is rotated the cam 370 releases limit switch LS5, opening the contacts LS5–2 and closing contacts LS5–1. The limit switch LS7 and its actuator, cam 372 are so located that the switch is actuated only when the chuck is 180 degrees from the initial loading position. When limit switch LS7 is not actuated, as in the present portion of the cycle, its contacts, LS7–2 are open, contacts LS7–1 are closed. As the indexing slide 120 completes its forward stroke, the strip 344 actuates limit switch LS14, closing its contacts LS14–1. This closes the circuit L5, LS8–1, PS2–4, LS12–1, LS10–2, LS14–1, LS5–1, LS7–1, solenoid J, ground, energizing solenoid J.

This solenoid, when energized, operates valve 400 to permit air to pass through line 404 into the head end of cylinder 178. The piston rod 176 accordingly advances the lock bolt 164 into engagement with its seat in one of the recesses 160 in cam ring 92 and the drum 50 and chuck 42 are locked against rotation. This movement of the lock bolt 164 reverses the position of the contacts of the limit switch LS10, opening contacts LS10–2 and LS10–3 and closing contacts LS10–1 and LS10–4. Consequently, the circuit through solenoid J is opened and that solenoid is deenergized.

The chuck 42 and chuck drum 50 are now in what will be termed No. 1 tapping position. In this position the cam 374 actuates the limit switch LS9, closing its single pair of contacts LS9–1, which closes the circuit L5, LS8–1, PS2–4, LS12–1, LS9–1, LS10–4, CR3–3, solenoid L, ground, energizing solenoid L. The contacts CR3–3 are associated with a relay CR3 and are normally closed, as now. The solenoid L operates the valve 410 connected to pressure line 376 to admit air to the line 412 whence it passes through the air operated valve 414 into the line 416. It will be understood that the valve 414 will have been left in the proper position for such passage by the previous cycle. From the line 416 the air under pressure passes into the head end of a cylinder 418. A one-way metering valve 420 is installed in line 416 to permit free flow toward the cylinder 418 and to meter the air moving in the opposite direction.

Under the influence of air entering the head end of cylinder 418, the piston rod 422 thereof lifts the counter- weights (not shown) customarily used to balance the weight of the spindle 398 and its associated parts, including the tap 34. Thus the spindle 398 is permitted to move rapidly downward. As in the above-mentioned copending application, a conventional hydraulic check device may be employed to control the speed of the spindle in this movement.

As the spindle 398 starts downward, the limit switch LS8 is released, opening contacts LS8–1 and closing the contacts LS8–2. These contacts close a circuit L5, LS8–2, CR3–4, CR3, ground, thus momentarily energizing the relay CR3 through its normally closed contacts CR3–4, which immediately open. However the energization of relay CR3 also closes contacts CR3–1 and CR3–2 and opens contacts CR3–3. Thus a holding circuit L5, LS8–3, CR3–1, CR3, ground, is closed to keep relay CR3 energized. Opening of the contacts LS8–1 also opens the circuit through solenoid L to de-energize it.

When the downward travel of the spindle disposes the tap 34 in the position in which tapping is about to begin, the limit switch LS11 is actuated, momentarily closing its single pair of contacts LS11–1, and closing the circuit L5, LS8–2, LS11–1, solenoid N, ground, to energize solenoid N. This momentary energization of solenoid N operates the valve 424 to admit air under pressure into the line 426 whence it passes through the regulating valve 428 and the check valve 430 into the head ends of both cylinders 432 to force the leadscrew nuts 434 into operative engagement with the leadscrew 436. Since a high pressure is not required in this operation and indeed may damage the leadscrew or nuts, the regulating valve 428 is provided to reduce the line pressure. The check valve 430 prevents air from exhausting through the valve 428 and forces it to discharge freely through the check valve 438 installed in the branch line 440, so that the exhaust is unimpeded and instantaneous. Pressure in line 426 shifts the valve 414 to open the line 416 to exhaust. Thus there will be no effective pressure in either end of cylinder 418 while the leadscrew nuts are closed. The closing of the leadscrew nuts reverses the position of the contacts of limit switch LS13, opening contacts LS13–1 and closing contacts LS13–2.

With the leadscrew nuts 434 upon the leadscrew 436, the tapping operation proceeds. At the end of the operation the tap collapses by well-known mechanical means and the chasers are withdrawn from contact with the work. At the same time the limit switch LS12 is actuated, opening contacts LS12–1 and closing contacts LS12–2. Accordingly, the circuit L5, LS8–2, LS12–2, LS13–2, solenoid P, ground is closed, energizing solenoid P. The energization of solenoid P reverses the position of the valve 424, admitting air under pressure into the line 442 and thence into the rod end of cylinders 432 to disengage the leadscrew nuts. The head ends of cylinders 432 exhaust through line 440 and valves 438 and 424.

The opening of the leadscrew nuts again actuates the limit switch LS13, opening contacts LS13–2 and closing contacts LS13–1. Thus the circuit through the solenoid P is opened and that solenoid is de-energized. The closing of contacts LS13–1 closes a circuit L5, LS8–2, LS12–2, LS13–1, solenoid M, ground, energizing solenoid M. The energization of solenoid M shifts the valve 410 permitting air under pressure to enter the line 444 and to pass through it into the rod end of the cylinder 418 to force the piston thereof downwardly and elevate the spindle 398. At the same time, pressure in the line 444 shifts the air-operated valve 414 to open the line 416—412, permitting the head end of cylinder 418 to exhaust through valve 410.

As the spindle 90 nears the upper limit of its travel, the limit switch LS15 is momentarily actuated, closing its contacts LS15–1. This closes a circuit L5, LS8–2, LS12–2, LS13–1, LS15–1, solenoid K, ground, to energize solenoid K. This again causes the lock bolt 164 to be withdrawn, as described above, to allow the drum 50 to rotate. This withdrawal again reverses the position of the contacts of limit switch LS10, opening contacts LS10–1 and LS10–4 and closing contacts LS10–2 and LS10–3. The tap is reset mechanically, releasing the limit switch LS12, opening contacts LS12–2 and closing contacts LS12–1. The opening of contacts LS12–2 opens the circuits through solenoids K and M, de-energizing those solenoids.

When the spindle arrives at the top of its travel it again actuates limit switch LS8, opening contacts LS8–2 and closing contacts LS8–1. These contacts close the circuit L5, LS8–1, PS2–4, LS12–1, LS10–2, CR3–2, solenoid H, ground, energizing solenoid H. The energization of solenoid H resets the valve 406 to open the line 408 to exhaust and to supply air under pressure through line 446 to the rod end of cylinder 122 to retract the rack slide 120. As explained above such movement of the slide 120 and racks causes the ratcheting device 140 to rotate the ring gear 90 in the clockwise direction. Also, as the slide 120 starts its retracting stroke, the limit switch LS14 is released, opening contacts LS14–1. Just before the slide 120 reaches the end of its travel the finger 354 momentarily actuates the limit switch LS4, closing contacts LS4–1. This actuation has no effect at present. As the slide 120 reaches the end of its stroke the limit switch LS6 is actuated, opening contacts LS6–3 and closing contacts LS6–1 and LS6–2.

The opening of contacts LS6–3 opens the circuit L5, LS6–3, CR3–1, CR3, ground to de-energize the relay CR3, opening contacts CR3–1 and CR3–2 and closing contacts CR3–3 and CR3–4. Opening of contacts CR3–2 opens the circuit through solenoid H, de-energizing it. The rotation of ring gear 90, chuck drum 50 and the chuck 42, however, continues until the chuck is disposed 180 degrees from its initial loading position. At this point the cam 372 actuates limit switch LS7, opening contacts LS7–1 and closing contacts LS7–2. This closes the circuit L5, LS8–1, PS2–4, LS12–1, LS10–2, LS7–2, SW1–1, LS6–2, solenoid G, ground, energizing solenoid G.

This energization of solenoid G, as in its first energization described above, rotates the chuck 42 an additional 90 degrees thus positioning the second end of the work piece to be tapped. From this point the cycle repeats as before, tapping the second end of the work piece until the next retraction of the rack slide 120 which rotates the chuck an additional 90 degrees into its original loading position. Just before this position is reached the cam 370 actuates the limit switch LS5 and holds it in actuated position until the chuck rotation is completed, opening contacts LS5–1 and closing contacts LS5–2. Simultaneously with the actuation of LS5 the slide 120 momentarily closes the contacts LS4–1 to close the circuit L5, LS8–1, PS2–4, LS12–1, LS10–2, LS5–2, LS4–1, solenoid D, ground, energizing solenoid D.

The energization of solenoid D shifts the valve 388 to permit air to exhaust through line 390 from the chamber in drum 50 as the springs 76 expand to open the chuck grips. At the same time the drop in pressure in line 390 reverses the position of the contacts of the pressure switch PS2, preventing further energization of solenoid G and therefore further rotation of the chuck drum 50. Again, as the slide 120 reaches its retracted position the limit switch LS6 is actuated, opening contacts LS6–3 and closing contacts LS6–1 and LS6–2. Consequently the circuit L5, LS8–1, PS2–3, LS10–3, LS6–1, solenoid J, ground, is closed to energize solenoid J and thus to cause the lock bolt 164 to lock the chuck against rotation as before. The circuit and the machine are now in condition to begin another complete cycle.

If it is desired to perform only one threading operation before discharging the work piece, the selector switch is manually set to close contacts SW1–2 instead of SW1–1, thus effecting the energization of solenoid D after the chuck has rotated 180 degrees instead of 360 degrees. Thus with the drum 50 approaching 180 degrees from the start or loading position, the momentary actuation of limit switch LS4, closing contacts LS4–1, closes a circuit L5, LS8–1, PS2–4, LS12–1, LS10–2, LS7–2, SW1–2, LS4–1, solenoid D, ground. Thus the chuck is opened before a circuit is closed to continue the rotation of the chuck and the loading mechanism operates after one tapping operation and 180 degrees of rotation. This modified cycle also repeats automatically for as long as desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A work handling mechanism for a tapping machine having a base, a head stock and a reciprocable tap supporting spindle mounted in said head stock comprising, a drum, means mounting said drum in said base for rotary movement about a predetermined axis, said drum being fixed against axial movement, a chuck carried by said drum at one end thereof, the center of said chuck being disposed on an extension of the axis of said spindle, substantially horizontal work piece chute sections, said chute sections being aligned with each other and with the chuck center, one of said chute sections being disposed at one side of said chuck and the other chute section being at the opposite side of said chuck, means for simultaneously moving said chute sections toward said chuck to facilitate the passage of a workpiece between said chuck and said chute sections when the axis of said chuck is substantially horizontal for subsequently moving said chute sections away from said chuck to permit rotation of said chuck, and means operative when said chute portions are adjacent said chuck for moving a work piece along said one of said chute sections into said chuck and thereby displace a finished workpiece onto the other chute section.

2. Work handling mechanism for a tapping machine having a generally verticaly extending reciprocable tap supporting spindle, a chuck having its center on an extension of the axis of said spindle and being mounted for rotation about an axis normal to the spindle axis, a substantially horizontal work piece entrance chute at one side of said chuck, a substantially horizontal work piece exit chute at the opposite side of said chuck, said chutes being aligned with each other and with the center of said chuck, means for bodily moving said chute sections simultaneously toward said chuck to facilitate the passage of a workpiece between said chute sections and said chuck when the axis of said chuck is substantially horizontal and for subsequently moving said chute sections away from said chuck to permit the rotation of said chuck, and means operative when said chutes are adjacent said chuck for moving a work piece along said entrance chute into said chuck, the movement of said work piece into said chuck transferring a previously tapped work piece onto said exit chute.

3. A work handling mechanism according to claim 2 together with chuck opening and closing mechanism and control means operative to actuate said mechanism to close said chuck after a work piece is positioned therein, and for withdrawing said chute sections to permit the subsequent indexing of said chuck.

4. Work handling mechanism for a tapping machine having a generally vertically reciprocable tap supporting spindle and a chuck mounted below said spindle for indexing movement about an axis substantially normal to the spindle axis comprising a first work chute section for delivering work pieces to said chuck, a second work chute section for carrying tapped work pieces away from said chuck, said work chute sections being arranged on opposite sides of said chuck and being normally generally aligned with each other and with the center of said chuck, means for simultaneously moving said chute sections toward said chuck when the axis of said chuck is substantially horizontal and for moving said chute sections away from said chuck to permit the subsequent indexing movement of said chuck, and means effective to transfer a work piece from said first chute section into said chuck after said first chute section is moved inwardly to a position adjacent said chuck, the movement of said workpiece into said chuck transferring a previously tapped workpiece onto said second chute section.

5. The mechanism according to claim 4 togeher with means for raising a portion of the second chute section into the path of a work piece as it is moved into said chuck to assure the correct positioning of said work piece in said chuck.

6. The work handling mechanism for delivering work pieces to and removing work pieces from a rotatable chuck comprising entrance and exit chute portions positioned at opposite sides of said chuck and generally aligned with each other and with the center of said chuck, means for moving said chute portions bodily toward said chuck to facilitate the transfer of the workpiece between said chute portions and said chuck and for moving said chute portions bodily away from said chuck to permit the subsequent rotation thereof, means operative when said chute portions are adjacent said chuck to move a work piece from said entrance portion into said chuck, the movement of said work piece into said chuck moving a finished work piece from said chuck into said exit chute portion, and means operative after said previously tapped work piece is removed from said chuck for raising said exit chute portion into the path of the incoming work piece to function as a stop therefor.

7. The mechanism according to claim 6 wherein said last mentioned means comprises spring means constantly urging said exit chute portion to its raised position, a latch means for holding the chute portion in a lowered position, and means for tripping said latch in response to movement of said exit chute portion to a position closely adjacent said chuck.

8. A tapping machine comprising a base, a head stock, a reciprocable tap supporting spindle mounted in said head stock, a drum, means mounting said drum in said base for indexing movement about an axis normal to the axis of the spindle, said drum being fixed against axial movement, a chuck carried by said drum at one end thereof, the center of said chuck being disposed on an extension of the axis of said spindle, means for rotating said drum about its axis, substantially horizontal work piece chute sections, said chute sections being aligned with each other and with the chuck center, one of said chute sections being disposed at one side of said chuck and the other chute section being at the opposite side of said chuck, means for simultaneously moving said chute sections toward said chuck, means operative when said chute portions are adjacent said chuck for moving a work piece along one of said chute sections into said chuck, means for moving said chute sections away from said chuck to permit the subsequent indexing movement thereof, and control means operative automatically to index said chuck to position one end of said work piece beneath said spindle for tapping after said chute sections have been withdrawn.

References Cited in the file of this patent
UNITED STATES PATENTS

| | | |
|---|---|---|
| 2,206,031 | Drissner | July 2, 1940 |
| 2,621,346 | Jacobson | Dec. 16, 1952 |